United States Patent [19]

Rigby

[11] Patent Number: 5,356,070
[45] Date of Patent: Oct. 18, 1994

[54] PARTITIONED PAPERBOARD FOOD TRAY

[75] Inventor: William R. Rigby, Newark, Del.

[73] Assignee: Westvaco Corporation, New York, N.Y.

[21] Appl. No.: 9,775

[22] Filed: Jan. 27, 1993

[51] Int. Cl.$^5$ .............................................. B65D 5/48
[52] U.S. Cl. ............................ 229/120.17; 229/2.5 R; 220/416; 220/462
[58] Field of Search .......... 229/2.5 R, 120.16, 120.17; 220/416, 418, 461, 462

[56] References Cited

U.S. PATENT DOCUMENTS

| | | | |
|---|---|---|---|
| 1,170,776 | 2/1916 | Nagle | 229/120.16 |
| 2,046,485 | 7/1936 | Ringler | 229/120.17 |
| 2,214,525 | 9/1940 | Murguiondo | 229/120.17 |
| 2,591,548 | 4/1952 | Inman | 229/120.17 |
| 3,266,704 | 8/1966 | Deeren | 220/462 |
| 4,202,465 | 5/1980 | McLaren | 229/120.17 |
| 4,301,960 | 11/1981 | Alexander et al. | 229/120.17 |
| 4,337,116 | 6/1982 | Foster et al. | |
| 4,533,065 | 8/1985 | Chazal et al. | 229/462 |
| 4,722,474 | 2/1988 | Dropsy | 220/462 |
| 4,848,648 | 7/1989 | Eisman | 229/120.17 |
| 4,905,889 | 3/1990 | Schuster | 229/120.17 |
| 5,009,363 | 4/1991 | Zavatone | 229/120.17 |
| 5,009,939 | 4/1991 | Goldberg . | |
| 5,056,709 | 10/1991 | Cargile, Jr. | 229/120.17 |

FOREIGN PATENT DOCUMENTS 4017399 12/1991 Fed. Rep. of Germany ......................... 229/120.17

Primary Examiner—Gary E. Elkins
Attorney, Agent, or Firm—J. R. McDaniel; R. L. Schmalz; W. A. Marcontell

[57] ABSTRACT

A composite food packaging article having internal partitioning walls and corresponding method of manufacture is constructed from flat, machine formed paperboard. A pair of die cut and folded paperboard blanks are inserted within the opposing cavities of a blow mold. A hot-flow parison between the cavities expands to structurally unitize the folded paper blank into a fluid impermeable tray vessel.

9 Claims, 5 Drawing Sheets performed
PARTITIONED PAPERBOARD FOOD TRAY

BACKGROUND OF THE INVENTION

1. Field of the Invention

The present invention relates to a packaging article and corresponding method of manufacture.

2. Description of the Prior Art

U.S. Pat. No. 5,009,939 issued Apr. 23, 1991 to B. A. Goldberg describes a fluid tight packaging tray that is formed from machine laid paperboard. A pair of die-cut paperboard blanks are prefolded to a tray configuration and placed into a cooperative pair of blow molding cavities. A vacuum system within the respective cavities holds the blanks in place as a hot, extruded parison of polymer is positioned between the cavities. Sequentially, the paperboard blank lined cavities are closed upon the parison which is expanded by pressurized gas against the internal surface faces of the blanks. Here, the polymer is chilled to structurally unitize all the tray shaping panels of paperboard and to seal the tray walls with a continuous, fluid-tight barrier of polymer film.

The immediate product of a mold cavity pair is a singular, vessel enclosure having a circumferential band of unlaminated polymer. When the circumferential band is die-cut, the vessel enclosure opens into two completed trays, each having a stiff, tough, exterior paperboard cladding printed with sharp, bright, press-applied graphics.

Although the aforedescribed Goldberg tray and method of manufacture represents a hallmark in consumer packaging development, the further refinement of partitioning the tray volume within the perimeter walls has, until now, proven elusive. It has been the object of the present invention, therefore, to provide a planar, paperboard blank configuration, that, when folded and placed into a blow mold cavity set will produce a partitioned tray i.e., a tray in which the bottom area is divided by upstanding walls into separate, fluid-tight pool areas.

SUMMARY OF THE INVENTION

These and other objects of the invention are accomplished by a paperboard blank configuration wherein the finished product bottom area is divided into the desired number of pool areas. At least two adjacent pool areas are separated by a scored and folded wall that is of less height than the full tray depth.

When folded into a blow molding cavity and internally lined with a continuous film of hot, pressure formed polymer, a structurally rigid, partitioned tray results.

DESCRIPTION OF THE DRAWINGS

Relative to the drawings wherein like reference characters designate like or similar elements throughout the several drawing figures.

DESCRIPTION OF THE PREFERRED EMBODIMENT

The basic substrate material for the present invention is machine laid paperboard which may range in thickness from 0.007 to 0.035 inches. In some cases it may be desirable to coat the paperboard web stock on that web side to be formed to the tray interior with a film of extruded or press applied polymer selected on the basis of chemical and adhesive receptivity to the subsequently applied parison polymer. However, due to the fact that extruded parison polymers of the type and nature anticipated by the present invention are applied to the paperboard blank mold liner at such temperature, viscosity and pressure, many tie films on paperboard substrates become unnecessary. The parison bonds deeply and securely to the untreated paper surface.

Those of ordinary skill in the art understand the economic value to consumer packaging arising from the quality of graphics that may be press applied to a clay coated paperboard web. Moreover, the web may be printed and die cut into individual tray blanks in one continuous machine fed operation. Resultantly, display shelf graphics may be directly applied to the exterior side of a package wall that is in direct contact with the package contents on the opposite wall side. No outer packaging or post-fill labeling is required. These properties and consequences of paperboard as a packaging medium are distinct from and uniquely valuable over molded packaging, whether of solid plastic or pressed cellulosic pulp.

Figure 1:
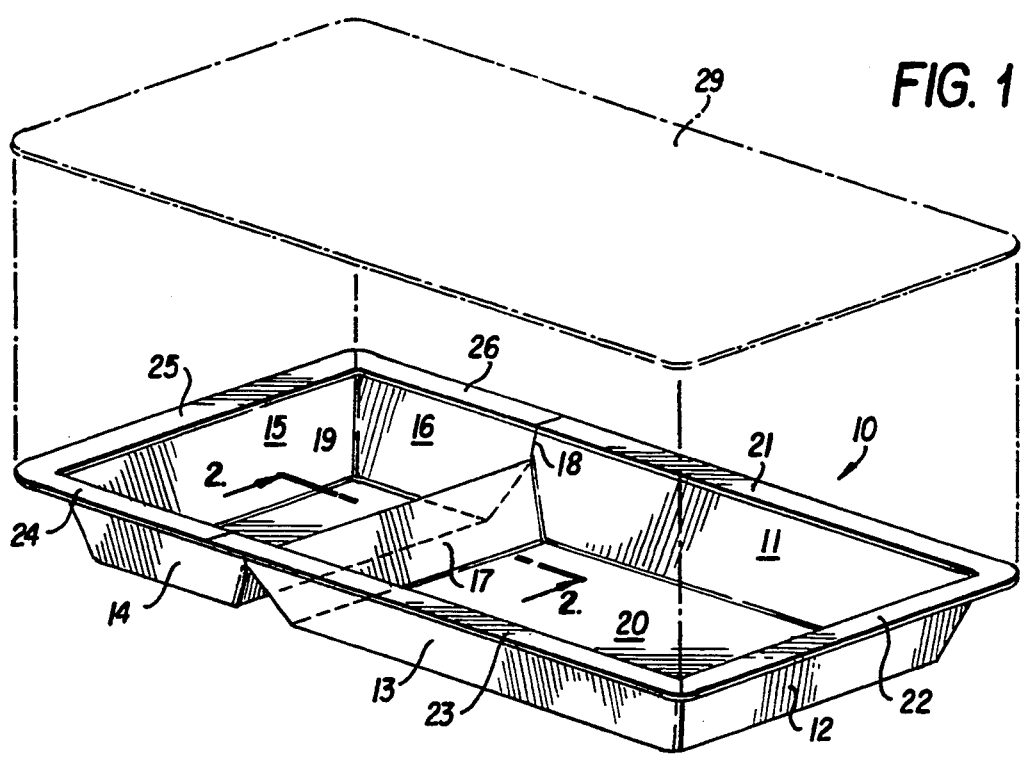
FIG. 1 is a pictorial view of the present invention tray product divided into two pools with a single, internal wall.

Proceeding from the foregoing understandings, FIG. 1 pictorially illustrates a finished form of the most simply executed embodiment of the present invention. Tray 10 is of nominally rectangular finished platform within the outer perimeter walls 11, 12, 13, 14, 15 and 16. An internal wall 17 divides the rectangular perimeter bottom into two smaller pool bottom areas 19 and 20.

Flanges 21, 22, 23, 24, 25 and 26 are integral with and turn outwardly from the plane of respective outer perimeter walls. The perimeter wall plane is set at a small angle, 10° for example, of departure from normal to the bottom panels 19 and 20 for the purpose of facilitating erected tray nesting.

The flanges 21 through 26 serve to structurally rigidify the upper edges of the outer walls 11 through 16 and to secure by thermal fusion a polymer coated tray cover panel 29 shown in phantom line.

Figure 3:
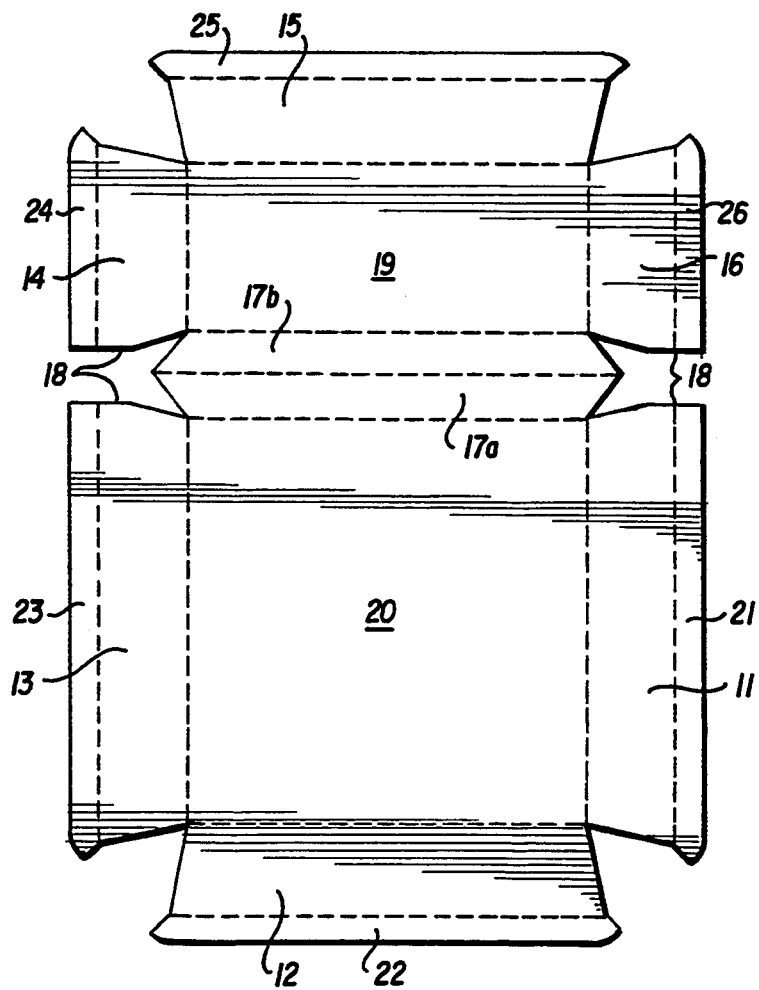
FIG. 3 is a cut and score plan for the paperboard blank used to form the tray product of FIG. 1.
Figure 2:
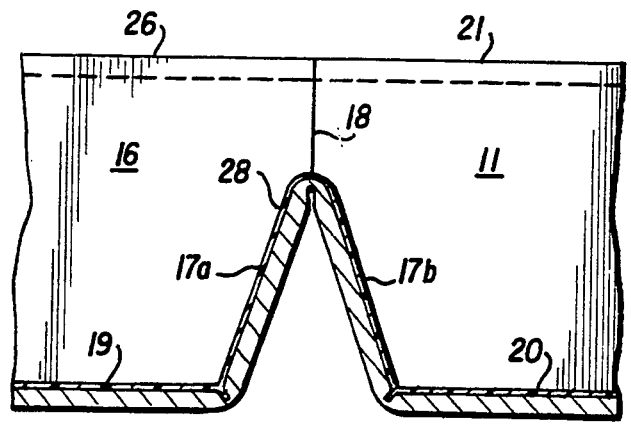
FIG. 2 is a sectional detail from FIG. 1 showing the folded internal wall intersection with an external wall.

Referring now to the sectional elevation of FIG. 2 which relates to the Detail II area of FIG. 1, and to the blank plan of FIG. 3, it is seen that the internal wall 17 comprises two panel sections 17a and 17b which are integral material continuations of bottom panels 19 and 20. Although the outer side walls 11 and 16 are also integral material continuations of bottom panels 19 and 20, the juncture 18 above the wall 17 pleat ridge is a discontinuous butt joint of the paperboard walls il and 16. Such butt joint is lapped by the blow parison polymer film 28. This detail is repeated on the opposite side of the tray between outer walls 13 and 14.

Functionally, the joint 18 is critical to the tray rigidity. It will be noted that if interior wall 17 is made the same height as the exterior walls 11 or 16, the wall 17 ridge would function as a hinge between pool areas 19 and 20. Such structural configuration may be useful to form a clamshell package having pool area 19 identical to pool areas 20 and one serving as the hinged lid for the other.

However, in the present invention the tensile strength of the polymer film 28 lapping the butt joint 18 and the planar compression strength of the paperboard combine to rigidify the joint. When combined with a top 29 that is heat fused around the entire flange perimeter, the configuration offers outstanding market place stress resistance.

Figure 4:
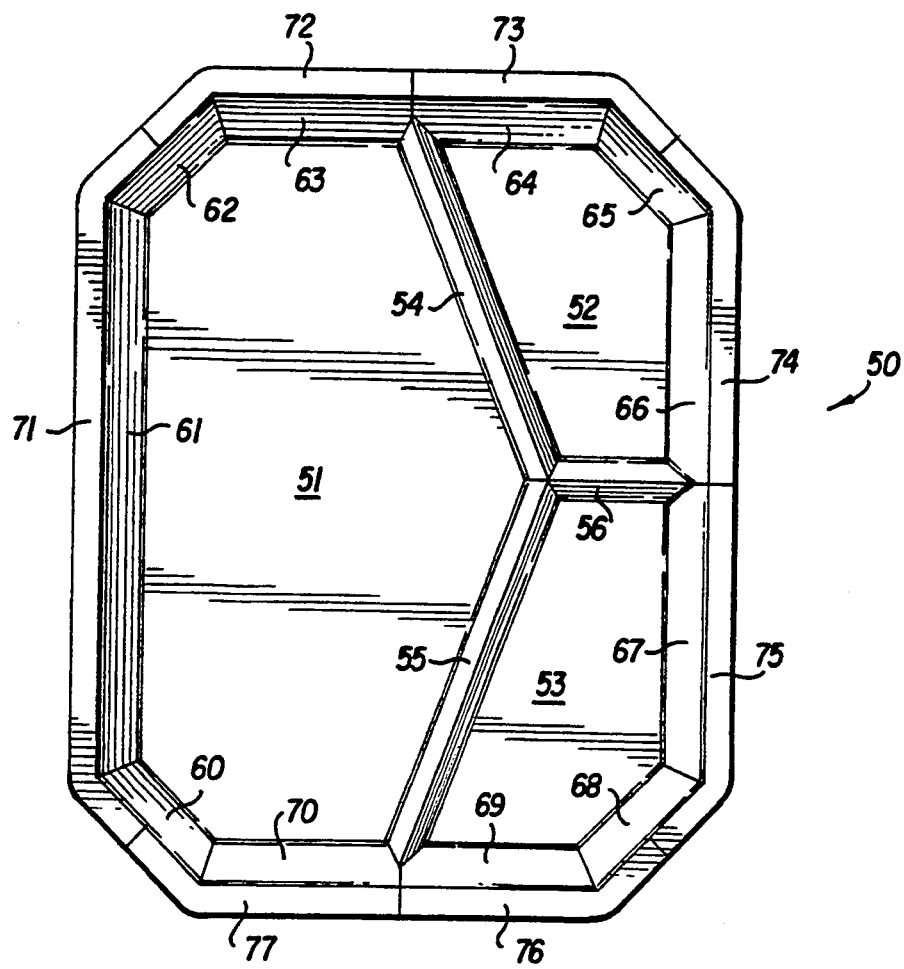
FIG. 4 is a plan view of the present invention tray product divided by three separate walls into three distinct pool areas.
Figure 5:
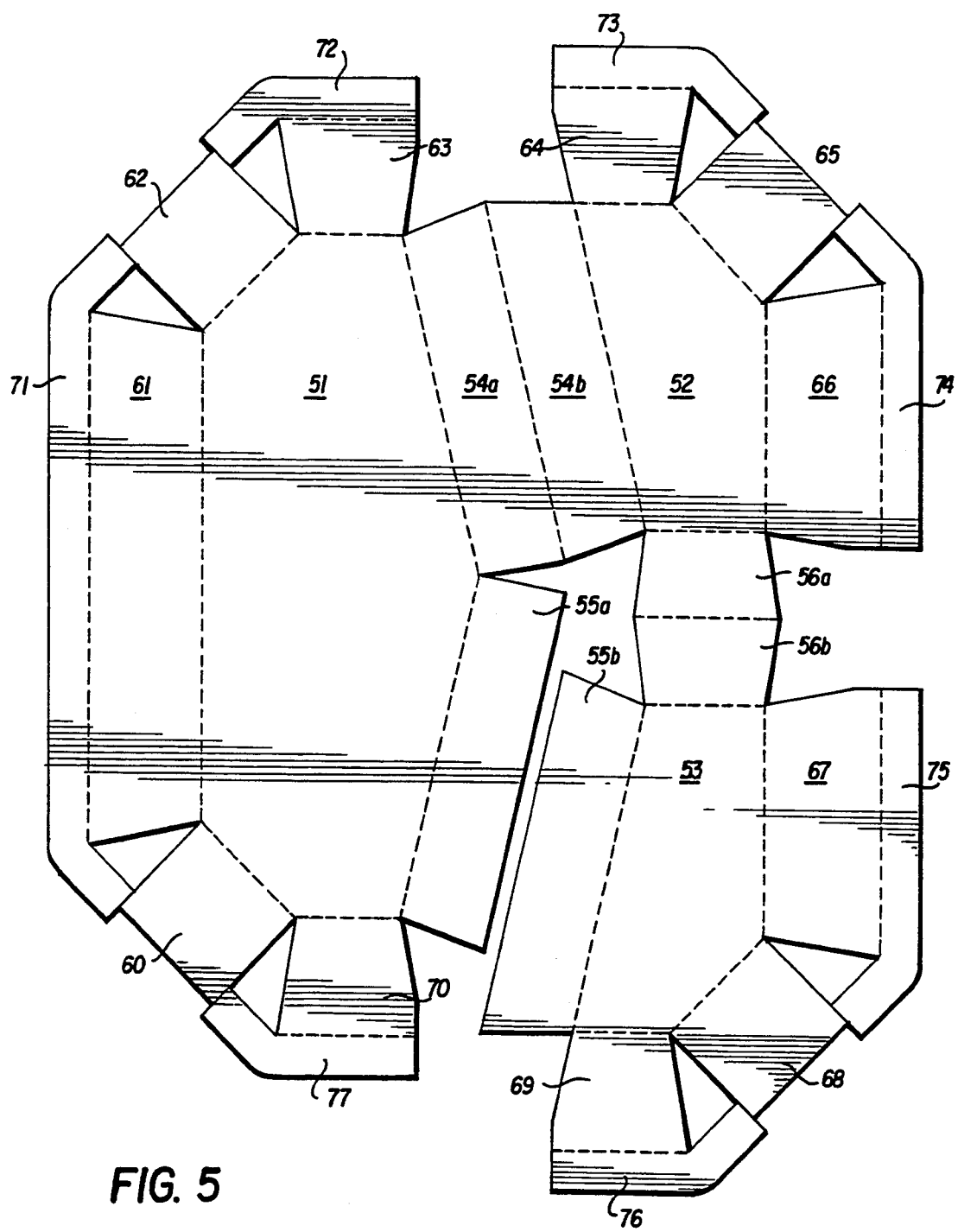
FIG. 5 is a cut and score plan for the paperboard blank used to form the tray product of FIG. 4.

Turning now to the more complex embodiment of the invention represented by FIGS. 4 and 5, the finished tray product 50 is a nominal rectangle having truncated corners and a bottom that is divided into three areas 51, 52 and 53 by interior walls 54, 55 and 56. Exterior perimeter walls 60, 61, 62, 63 and 70 are integral continuations of the bottom panel 51 delineated by respective score/fold lines. Similarly, exterior perimeter walls 64, 65 and 66 are integral continuations of the bottom panel 52. Exterior perimeter walls 67, 68, and 69 are integral continuations of bottom panel 53.

Interior wall panels 54a and 54b (FIG. 5) integrate bottom panels 51 and 52 and interior wall panels 56a and 56b integrate bottom panels 52 and 53. However, interior wall panels 55a and 55b are discontinuous between bottom panels 51 and 53.

Seven top flange areas 71 through 77 are integral extensions of outer perimeter wall panels 61, 63, 64, 66, 67, 69, and 70, respectively.

Included among the several characteristics common to all embodiments of the invention is the absence of lapped panels. Respective edges of adjacent panels fold to contiguous alignment with no overlap. Selective prefolding prior to placement of a cut blank into a mold cavity and vacuum held positionment within the mold cavity maintains such precise edge alignment until a blown parison film is chilled against the interior blank surface.

Another characteristic common to two of the embodiments includes an interior partition wall height that is less than the tray depth at the outer perimeter walls and a polymer film lapped butt joint of outer wall edges extending upwardly to the outer flange edge from the interior wall ridge apex.

Figure 6:
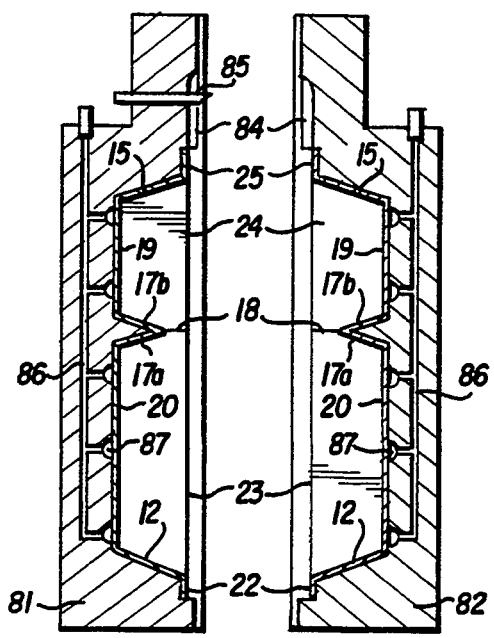
FIGS. 6 through 10 each represent respective stages of the blow molding operation relevant to the present invention.

Continuing with the invention description and the blow molded application of a polymer film to the paperboard blank of the FIG. 3 configuration. FIG. 6 illustrates a blank positioned in each of a pair of blow mold cavity halves 81 and 82. These cavity halves are mechanically linked to reciprocate from an open position represented by FIGS. 6, 7 and 10 to a closed position represented by FIGS. 8 and 9. At one end of the mold halves, the product cavities open into a plenum section 84 configured to confine an inflation bulb. Mold half 81 is also provided with a hollow inflating needle 85.

Both mold halves are provided with vacuum conduits 86 having orifices 87 opening into the mold cavities. This vacuum system secures the position of an erected tray blank in each mold cavity prior to film application; these tray blanks being placed within the respective cavities while the mold unit is open as represented by FIG. 6.

Figure 7:
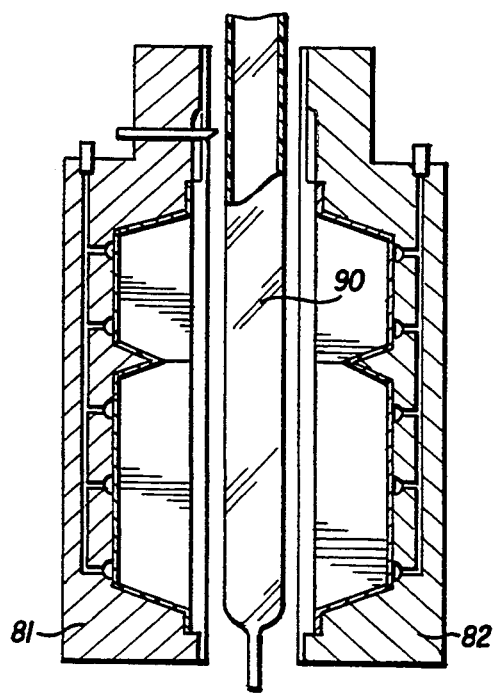

Also while the mold unit is open, a tubular length of melted polymer material, known to the art as a parison 90, is extruded between the open mold halves as shown by FIG. 7 at a temperature within the range of 250° F. to 600° F. More descriptively, the parison 90 is a continuous, vertically hanging extrusion around which the wheel mounted open mold pairs are positioned tangentially.

Figure 8:
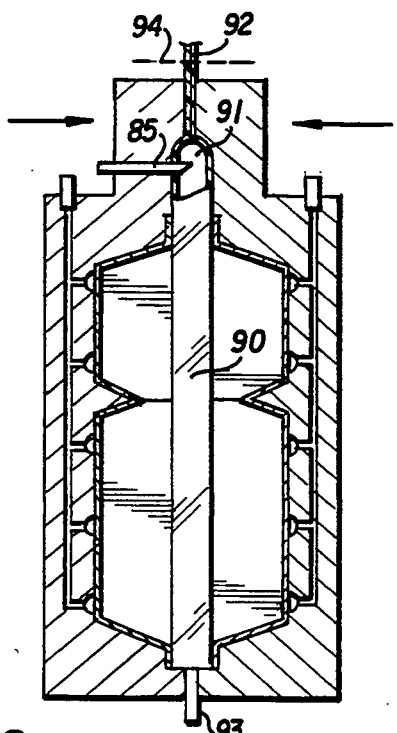

With the tray banks and parison 90 in place, the mold halves 81 and 82 are closed upon the parison 90 as represented by FIG. 8 thereby sealing the upper end of the parison along a fused seam 92. The lower or distal end of the parison 90 is sealed along seam 93 by the same mold closure movement.

Figure 9:
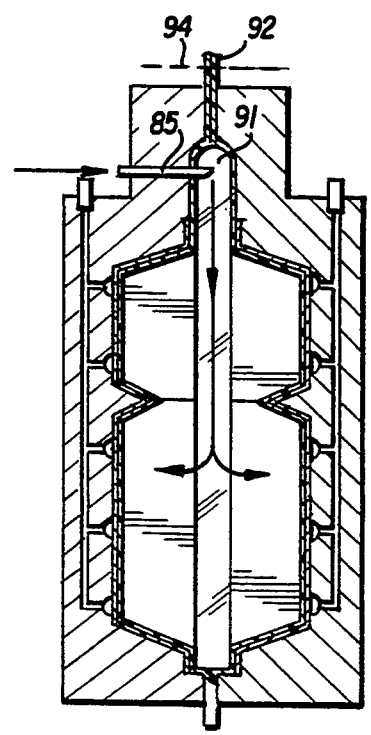

Closure of the mold halves 81 and 82 also pushes the inflation needle 85 through the parison wall film of inflation bulb 91. In this condition, a charge of compressed air or other gas, in the order of 5 to 90 psi, is released through the inflation needle 85 into the inflation bulb 91 and, consequently, into the closed interior of parison 90. Such pressure within the parison 90 expands the hot, malleable polymer tube tightly against the mold cavity walls and inner surfaces of the tray blank as shown by FIG. 9.

Figure 10:
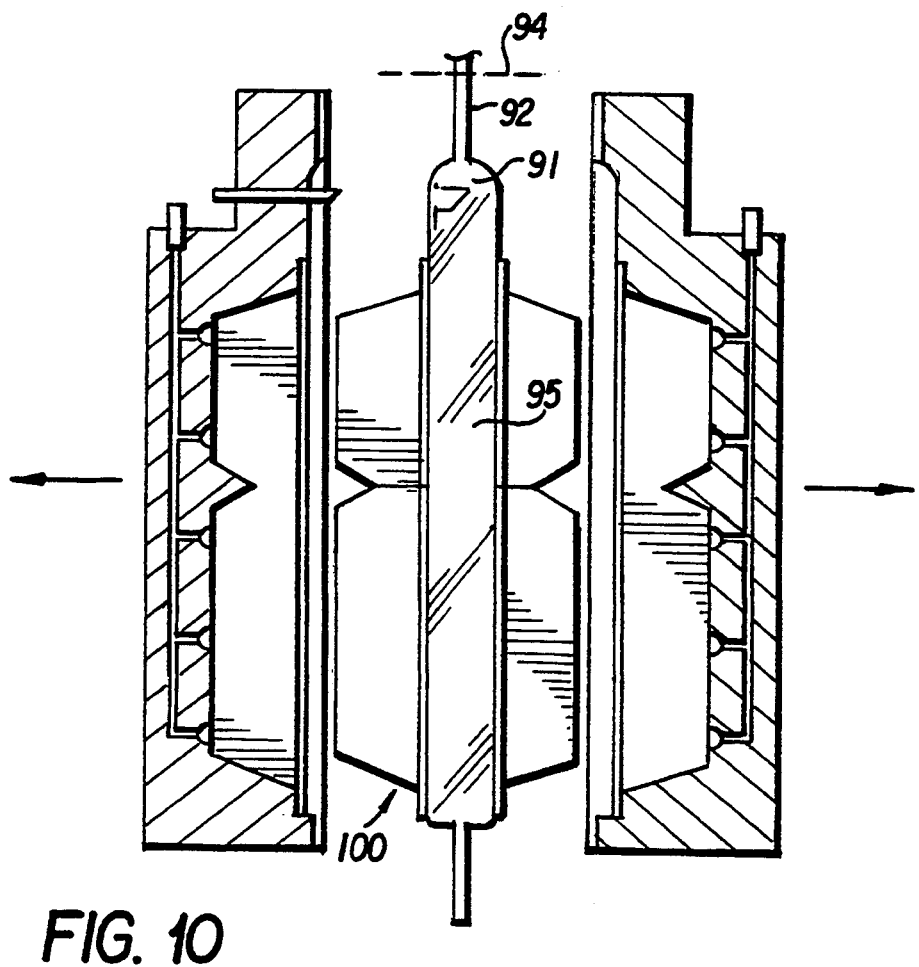

Following a brief chilling interval, the two mold halves 81 and 82 are separated as represented by FIG. 10 leaving the two tray blanks securely bonded to the inflated parison 90 as a singular unit 100. This unit 100 is then separated from the extruded parison continuity by a cut 94 across the fused seam 92.

At this point in the process, unit 100 represents two semifinished trays joined by a continuous, unlaminated band 95 of polymer which includes the inflation bulb 91.

Figure 11:
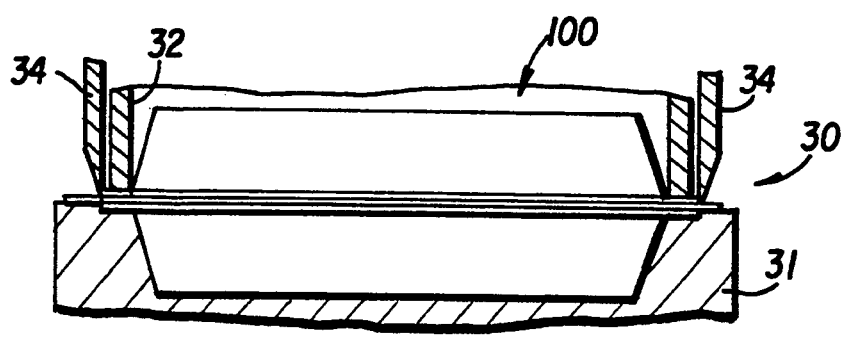
FIG. 11 illustrates a trimming operation performed on the blow mold raw product.

Following severance of the parison, the segregated unit 100 is placed upon the anvil element 31 of a cutting die 30 (FIG. 11). As shown by FIG. 11, striker element 32 engages the underside of the first tray flange area and presses it against the upper face of the second tray flange area. Held at this position by die 30, the excess polymer material represented by band 95 may be trimmed by a shear 34.

Although the extruded parison 90 has been generally described as a homogenous polymer material, which it may be, it should be understood that the invention is not so limited. The melted polymer extrusion art is capable of extruding multiple layers of diverse polymers in a single parison flow stream. Consequently, film 28 composites may be designed to include several different compound layers, each selected on the basis of maximum barrier properties and functions for a specific gas or combination of gases.

Having fully described the preferred embodiments of my invention,

I claim:

1. A paperboard package blank for erecting a divided tray shaped vessel, said tray having at least two distinct vessel sections separated by internal wall panels, wherein said blank is comprised of:

a paperboard sheet material base having an interior surface lined with a continuous and unlapped layer of a blow molded polymer applied to said interior surface, wherein said base is formed into at least two bottom panel areas with each of said bottom panel areas being in the shape of a polygon having straight line perimeter segments delineated by first and second fold score lines such that said first and second fold score lines radiate in straight lines from a common point of termination;

at least two internal wall panels materially integral with each of said bottom panel areas such that said first fold score lines are located substantially between said internal wall panels and each of said bottom panel areas, wherein said internal wall panels are substantially aligned along an internal wall edge that is substantially parallel to said first fold score lines;

at least two external wall panels materially integral with each of said bottom panel areas such that said second fold score lines are located substantially between said external wall panels and each of said bottom panel areas;

a top flange located adjacent to at least one of said external wall panels such that an external wall edge is located substantially between said top flange and said external wall panels, wherein said external wall edge is substantially parallel to said second fold score lines;

a plurality of first side edges located substantially adjacent to said internal wall panels and radiating in substantially straight lines for a predetermined length from a terminus of said internal wall panels to said internal wall edge; and a plurality of second side edges located substantially adjacent to said external wall panels and radiating in substantially straight lines for a first length substantially corresponding to said first side edge length and continuing, at an angle to said first length, along a straight line to said top flange.

2. The paperboard package blank, as in claim 1, wherein said bottom panel areas are of equal size.

3. The paperboard package blank, as in claim 1, wherein said bottom panel areas are of unequal size.

4. The paperboard package blank, as in claim 1, wherein a distance in a normal direction between said top flange and said bottom panel areas is greater than a distance in a normal direction between said internal wall edge and said bottom panel areas.

5. The paperboard package blank, as in claim 1, wherein said base is further comprised of:
   a third bottom panel area; and
   at least two sets of said at least two internal wall panels, wherein said third bottom panel area and one of said at least two bottom panel areas are materially integral with one set of said at least two internal wall panels.

6. The paperboard package blank, as in claim 5, wherein said third bottom panel is materially integral with one of said internal wall panels of said other set of said at least two internal wall panels and the other of said at least two bottom panel areas is materially integral with the other of said internal wall panels of said other set of said at least two internal wall panels such that said internal wall panels of said other set of said at least two internal wall panels are joined along said internal wall edge.

7. The paperboard package blank, as in claim 1, wherein said blank is further comprised of:
   a plurality of butt joints located substantially between said first and second side edges.

8. The paperboard package blank, as in claim 7, wherein a butt joint is located in a substantially straight line between a terminus of said internal wall edge and said top flange.

9. The paperboard package blank, as in claim 1, wherein said polymer is blow molded at a temperature range of 250° to 600° F.

* * * * *

UNITED STATES PATENT AND TRADEMARK OFFICE
CERTIFICATE OF CORRECTION

PATENT NO. : 5,356,070
DATED : Oct. 18, 1994
INVENTOR(S) : William R. Rigby

It is certified that error appears in the above-indentified patent and that said Letters Patent is hereby corrected as shown below:

Column 2, line 65, change "il" to --11--.

Signed and Sealed this

Third Day of January, 1995

Attest:

BRUCE LEHMAN

*Attesting Officer*  *Commissioner of Patents and Trademarks*